United States Patent
Patrikakis et al.

(10) Patent No.: US 12,262,285 B2
(45) Date of Patent: Mar. 25, 2025

(54) METHOD AND DEVICE FOR BROADCASTING MESSAGES

(71) Applicant: THINGENIOUS PC, Athens (GR)

(72) Inventors: Charalampos Patrikakis, Egaleo (GR); Aristidis Konstantas, Athens (GR); Christos Chatzigeorgiou, Egaleo (GR); Vasileios Doulgerakis, Egaleo (GR)

(73) Assignee: THINGENIOUS PC, Athens (GR)

( * ) Notice: Subject to any disclaimer, the term of this patent is extended or adjusted under 35 U.S.C. 154(b) by 1000 days.

(21) Appl. No.: 17/219,349

(22) Filed: Mar. 31, 2021

(65) Prior Publication Data

US 2021/0306816 A1    Sep. 30, 2021

Related U.S. Application Data

(60) Provisional application No. 63/002,835, filed on Mar. 31, 2020.

(51) Int. Cl.
| | |
|---|---|
| *H04W 12/037* | (2021.01) |
| *H04L 69/22* | (2022.01) |
| *H04W 4/06* | (2009.01) |
| *H04W 4/80* | (2018.01) |
| *H04W 4/90* | (2018.01) |
| *H04W 84/12* | (2009.01) |

(52) U.S. Cl.
CPC ............. *H04W 4/06* (2013.01); *H04L 69/22* (2013.01); *H04W 4/80* (2018.02); *H04W 12/037* (2021.01); *H04W 4/90* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 9,510,201 B1 * | 11/2016 | Shimoon | H04W 12/06 |
| 10,149,159 B1 | 12/2018 | Perfitt | |
| 2016/0066212 A1 * | 3/2016 | Visweswara | H04W 48/00 370/474 |
| 2016/0100311 A1 | 4/2016 | Kumar | |
| 2018/0124154 A1 * | 5/2018 | Watson | H04M 1/6091 |
| 2018/0199115 A1 | 7/2018 | Prasad | |

OTHER PUBLICATIONS

European Patent Application No. EP 20 16 7230.0, Extended European Search Report mailed Sep. 10, 2020, 9 pages.

* cited by examiner

*Primary Examiner* — Robert M Morlan
(74) *Attorney, Agent, or Firm* — Kilpatrick Townsend & Stockton LLP

(57) ABSTRACT

A method for broadcasting messages by means of identification features of existing wireless communication protocols includes identifying, for a received message, a maximum packet length to be broadcasted using a wireless protocol. The method further includes splitting the received message into two or more packets, wherein the length of each packet of the two or more packets does not exceed the identified maximum packet length. The method further includes broadcasting the two or more packets by means of an identification feature of the wireless protocol.

17 Claims, 2 Drawing Sheets

METHOD AND DEVICE FOR BROADCASTING MESSAGES

CROSS-REFERENCE TO RELATED APPLICATION

This application is a non-provisional of and claims priority to U.S. Provisional Application No. 60/002,835, which was filed on Mar. 31, 2020. The entire contents of the above-referenced priority application is incorporated herein by this reference.

TECHNICAL FIELD

This disclosure generally relates to wireless broadcasting devices. More specifically, but not by way of limitation, this disclosure relates to broadcasting using wireless communication protocols.

BACKGROUND

With the effects of climate change increasing the frequency of hazardous events such as floods, landslides, hurricanes and tornadoes, which in turn may disable the power and communication infrastructure in large areas, the need for a robust way to quickly broadcast critical information on the protection of citizens is becoming more and more important. If infrequent but unfortunately possible events such as large scale earthquakes, blizzards, extensive floods, industrial accidents or other man-made disasters are also considered, this need becomes even more evident.

Even though centrally managed systems for such purposes exist, the ability to a locally activate a system which may even be specialized to the particular conditions of the covered area may be of utmost importance. Such a system could act complimentary to existing, centrally/government administered infrastructure. In particular, in cases of emergency caused by natural catastrophic events, communication networks and the electric power grid may be unavailable. Even if power supply should still be available and communication networks are operational, the rapid increase in communication attempts by citizens as well as the volume of communication data can prohibit the safe delivery of emergency instructions. Furthermore, the ability to provide specific instructions to the citizens, considering the particularities of the particular area, creates the need for location aware targets and notifications. This need for specialized notifications is even more evident for rescue teams and first responders.

SUMMARY

Certain embodiments involve a method for broadcasting messages by means of identification features of existing wireless communications protocols. The method includes identifying, for a received message, a maximum packet length to be broadcasted using a wireless protocol. The method further includes splitting the received message into two or more packets, wherein the length of each packet of the two or more packets does not exceed the identified maximum packet length. The method further includes broadcasting the two or more packets by means of an identification feature of the wireless protocol.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1A:
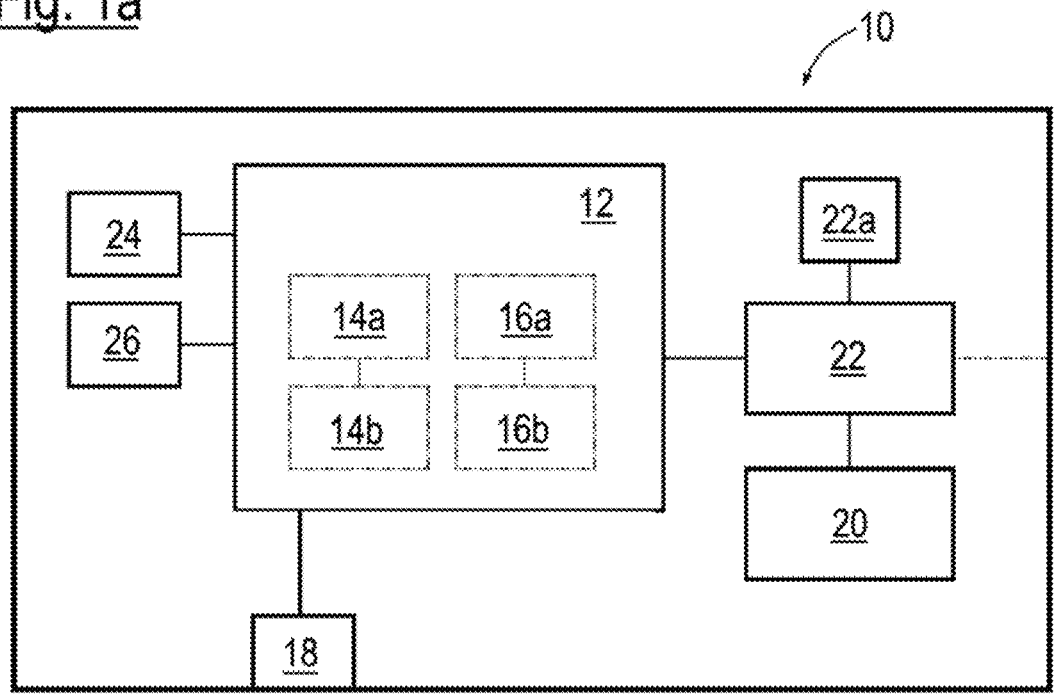
FIG. 1A depicts a first schematic view of a device, according to certain embodiments described in the present disclosure.

An objective of the embodiments described herein is to provide a means to massively distribute target aware information (e.g. location and situation information) while offering extendibility through the use of low cost devices without the need for special installations. The present invention provides a method for broadcasting messages by means of the identification feature of an existing wireless communication protocol, comprising identifying a maximum possible length of a single packet to be broadcasted on the basis of the wireless protocol, splitting the message to be broadcasted into a number of packets (e.g. two or more packets), the length of each of the number of packets not exceeding the identified maximum length and broadcasting the packets by means of the identification feature of the wireless protocol.

With all sorts of devices able to connect to wireless communication networks that are already in widespread use, employing the identification feature of these devices for transmitting messages, while naturally having certain restrictions (e.g. restrictions concerning an amount of data and thus a possible length of a message) is a very robust and fail-safe approach to reach a large percentage of the population in a certain area.

In certain embodiments, the identification feature of the existing wireless protocol may be an advertisement packet feature of a Bluetooth protocol or a service set identifier ("SSID") feature of the Institute for Electrical and Electronics Engineers ("IEEE") 802.11x Wi-Fi protocol. Even though these examples of protocols are currently widely in use, it shall be understood that the method according to the present invention may be combined with any known wireless communication protocol and any future communication protocols as long as the communication protocols comprise an identification feature which can be employed in the above-described manner. In any case, the present method corresponds to an "overloading" of the identification feature of the respective communication protocol for transporting information beyond identifying the network itself or a device establishing it. In a very simple yet illustrative example, the well-known feature of the IEEE 802.11x Wi-Fi protocol to be able to name the individual Wi-Fi networks may be utilized by using the message to be broadcasted as the name of a network which is established by a master device, possibly split among multiple packets given the restrictions on the possible length of network names in said standard.

The present invention thus solves its object by taking advantage of widely used technologies and the use of readily available and distributed devices, while offering low costs and being easy to widely deploy as well as upgrade. Furthermore, it offers the basis for easy and continuous updates of the communicated information, so it may always be up to date and inform its users about the current status and situation.

The wide availability of mobile devices capable of using Wi-Fi and/or Bluetooth can be utilized in the method according to the invention for delivering information in a broadcast mode and for an adequate time period. In particular, the present invention may provide a secure and resilient mode of massively delivering instructions and critical information in cases of emergency situations and it can be used to address the following needs. Firstly, it may provide a robust way for delivering critical information about emergency plans or crisis related information to rescue teams and first responders, and secondly it may massively deliver to citizens instructions and how to respond to crisis situations and how to protect themselves from hazards.

In order to further improve the method according to the invention and in particular to increase its robustness against misuse, it may additionally comprise signing the packets before their broadcast, and/or providing the packets with metadata, such as a numbering or a time stamp, and/or encrypting the message before its splitting or the packets after the splitting. For these purposes, known encryption and signing technologies as well as all suitable sorts of metadata can be employed.

In order to retrieve the messages by end users and in a second step to scale the method according to the invention by including successive subsequent (e.g., second, third, etc.) broadcasting layers for the respective messages, the method may further comprise, for example performed by a device of a different type than the device originally broadcasting the message, receiving the message to be broadcasted, in particular via the same identification feature of an existing wireless communication protocol used for broadcasting the message, and optionally verifying the signatures of the packets of the received message. In other words, the devices may act as relay nodes for establishing a massively scalable mesh network. After said receiving and optionally verifying the message, it cannot only be displayed to end users of suitable devices but also be rebroadcasted by means of the originally selected identification feature of the wireless protocol by the receiving device. Thus, an avalanche of broadcasted messages can be achieved which can quickly and efficiently reach arbitrarily large areas and numbers of devices.

In order to ensure the integrity and completeness of the messages to be broadcasted, broadcasting of the packets may comprise sequentially broadcasting the packets. Further, sequentially broadcasting the packets may comprise sequentially broadcasting the packets in a rotating manner. Said broadcasting of the packets in a rotating manner may be performed regardless of the broadcasting order. Thus, over an arbitrary time spam, the message to be broadcasted will be broadcasted over and over again by circularly resending each packet.

In order to implement the method according to the invention, the invention also relates to a device for broadcasting messages using the method according to the invention and comprising a power supply, at least one wireless communication module, and a control unit powered by the power the supply unit, operatively connected to the at least one wireless communication module and adapted to perform the steps of the method according to the invention. Said power supply unit may comprise a battery, preferably a rechargeable battery, and optionally a battery charger unit. By providing the device for broadcasting messages with a battery, the device will be able to operate independently from the power grid and will thus also be able to broadcast messages in the case of power outages. As another way of guaranteeing operation independently from the power grid, the power supply unit may comprise a supply source for renewable energy, such as a photovoltaic or solar panel installation, which may be combined with the device in outdoor use cases. This may even allow for the operation of the device in remote areas without any access to the power grid.

In order to enable receiving and transmitting the respective messages at the same time, which is especially important for higher layer devices, which are not the original source of the message to be broadcasted but rather serve as relay devices, the wireless communication module may comprise at least two antennas. Such devices may, for example, be handheld devices used by rescue teams which will not trigger the message to be broadcasted themselves but may receive and re-transmit them. Even though, in single antenna configurations, it may be possible to alternately operate the antenna in reception and broadcast modes, this will cause a delay which may, in some scenarios, not be acceptable. In particular, for true parallelization, multiple antennas are required, since, when employing a single antenna, it would have to be switched between Tx and Rx modes. More than two antennas may as well be provided in order to increase the number of messages to be transmitted simultaneously or reduce the message broadcasting cycle time.

Especially in the case of low maintenance and thus robust and easy to use devices according to the invention, the device may be provided with a single control button and/or an indicator LED. Such configurations may especially be useful in cases in which only single types of messages should be possible to be broadcasted, such as a general warning or emergency information message. Thus, pressing the single control button may trigger broadcasting said single available message, while the indicator LED may indicate sufficient remaining battery charge or the ON/OFF status of the broadcasting at any given time. In other embodiments, multi-coloured LEDs might be used which could indicate different states of the device, such as, "on", "transmitting" and "in configuration mode". However, in more elaborate embodiments, the device may also comprise any suitable input means for inputting messages to be broadcasted as well as further components generally known for such purposes.

In particular for a first layer device, i.e. the device which originally broadcasts the respective message, also referred to as a master device, it can be beneficial if a communication module of the device may be adapted to selectively operate in a broadcast-only mode. Such configuration also contributes to a robust and easy to operate design of the device according to the invention. In a related aspect of the invention, the device may be implemented as a single board computer or may comprise one. Such devices are cheap and easy to manufacture, have low energy consumption, and are robust with long expected life times.

As mentioned above in the context of creating an avalanche of broadcasted messages by employing first, second, etc. layers of devices receiving and retransmitting the messages to be broadcasted, the invention also relates to a system comprising at least one device according to the invention as a master device and at least one secondary device, which may also be a device according to the invention, which operates as a slave or relay device or is at least capable of receiving the broadcasted packets and display them to a user in a suitable manner. Herein, the master and slave or relay devices refer to the first layer and the second, third, etc. layers of message transmission, respectively, wherein the master and slave devices may be of the same type or of different type, and while the master device only needs a broadcasting function, the secondary devices may either only receive the messages and inform their users about their contents or receive and retransmit the messages and thus serve as relay devices.

For this purpose, the secondary device may be adapted to execute a software application for displaying the broadcasted messages reconstructed from the received packets. For this purpose, the packets may comprise dedicated metadata for addressing the application and differentiating themselves from packets by means of which regular access points announce their networks. In case a message is only partially available to the secondary device at a given time, for example due to packet loss or a yet incomplete transmission, the software application may also be adapted to display the incomplete message with placeholders for missing parts thereof, such as blanks or dots, which may be replaced by the yet missing packets as soon as they become available. For this purpose, a suitable numbering of the packets and possibly additional metadata such as the total number of packets should be foreseen.

Even though an operating system based retrieving of the individual packets might also be usable, the individual packets would appear mixed in with any other information broadcasted by means of the same communication protocol and it would be hard for end users to decipher the message from the scattered packets, leading to the risk of user confusion or deception through the malicious transmission of messages by third parties. Thus, if operating system based retrieving of the individual packets is selected, a special identification scheme, for example including numbering of the packets transmitted by the device, should be used, in order to distinguish the relevant packets from packets by means of which regular access points announce their networks. As an alternative to a text-based output of a message, the secondary devices may also simply output an alarm, for example operate a status light-emitting diode ("LED") or sound an acoustic alarm.

In order to be able to make use of the security feature of signing the packets before their broadcast, the secondary device may furthermore be adapted to execute a software application verifying the respective signatures of the broadcasted packets.

In order to rely on massively distributed end user portable devices serving as secondary slave or relay devices, said devices may be embodied by a portable user terminal, such as a mobile phone, tablet computer or a wearable device equipped with a screen, such as a smartwatch. Thus, a massively distributed network can be established by a single master device broadcasting the messages by employing the method according to the invention, while as relay devices portable end user terminals such as mobile phones are used which are widely distributed anyway and simply have to run a software application capable of either simply receiving the relevant packets and informing their users about the broadcasted message or retransmitting said packets in order to create an avalanche of message broadcasting.

Figure 1B:
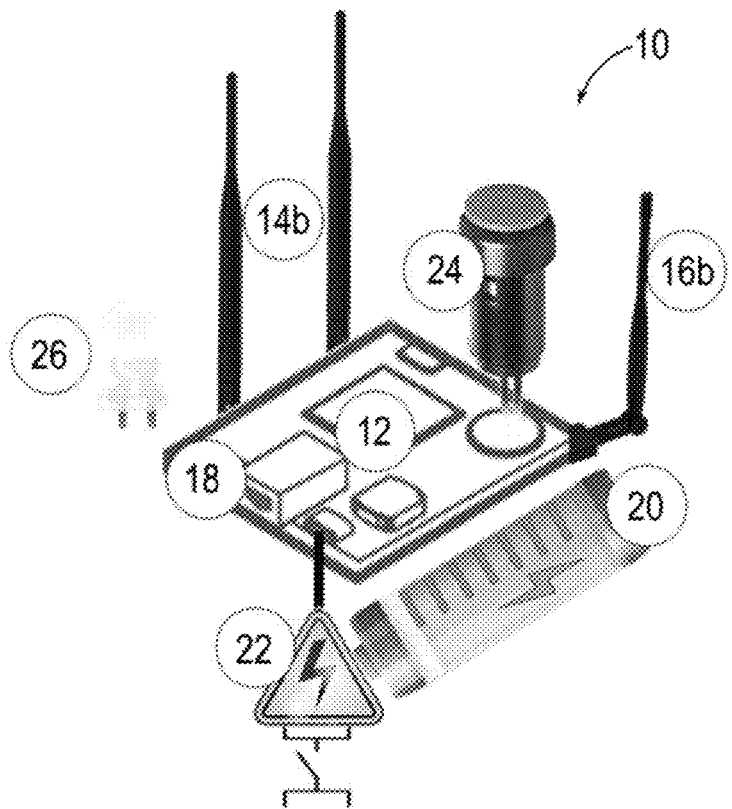
FIG. 1B depicts a second schematic view of the device of FIG. 1A, according to certain embodiments described in the present disclosure.

Examples of Systems and Example Operations for Broadcasting Messages by Means of Identification Features of Existing Wireless Communication Protocols Referring now to the drawings, FIG. 1A depicts a first schematic view of a device, according to certain embodiments described in the present disclosure and FIG. 1B depicts a second schematic view of the device of FIG. 1A, according to certain embodiments described in the present disclosure. FIGS. 1a and 1b each depict a device according to the invention shown in schematic views and generally denoted with the reference numeral 10. It is embodied by a single board computer 12 with minimal computing capabilities such as an integrated microcontroller, wherein on said board, a Bluetooth control module 14a and a Bluetooth antenna module 14b are provided, the latter in turn comprising two antennas, such that a concurrent broadcasting of advertisement packets and scanning for Bluetooth devices in the surroundings of the device 10 may be performed. Additionally, a WiFi (802.11) control module 16a and a single WiFi antenna 16b are provided. In alternative possible embodiments of the invention, plural WiFi antennas may be provided, only Bluetooth or WiFi functionality may be provided and/or additional communication channels and according components or any combination thereof may be provided.

The device 10 furthermore comprises an Ethernet (802.3) interface 18, by means of which the device 10 may be connected to external devices in a wired manner and by means of which the programming and/or controlling of the device may be performed. The Ethernet interface 18 as well as the WiFi components 16a and 16b may further operate as output devices for forwarding received messages to external components, e.g. for displaying the received messages. In alternative embodiments, additional or other input means may be provided and additional components such as a more powerful dedicated processing unit or a storage unit may be provided as parts of the single board computer 12, wherein a display for displaying received messages may also be directly interfaced thereto.

The power supply of the device 10 is embodied by a rechargeable battery 20 and a power supply unit 22 with an integrated dedicated charger, such that it can be ensured that while the device 10 is connected to the power grid the battery 20 will be charged and once the external power is cut, functionality of the device 10 is still guaranteed by the battery 20. The power supply unit 22 may further incorporate functionality to detect power outages and such in order to switch the device 10 to battery power and it may further comprise a main power switch 22a.

In order to switch the device 10 into broadcast mode, a control button 24 is provided, while the operation of the device 10 can be monitored by the status LED 26 which is turned on while the broadcast mode is active. In said broadcast mode, the device 10 by means of its Bluetooth and/or WiFi components in cooperation with its microcontroller or processing unit performs a broadcasting method according to the present invention.

Figure 2:
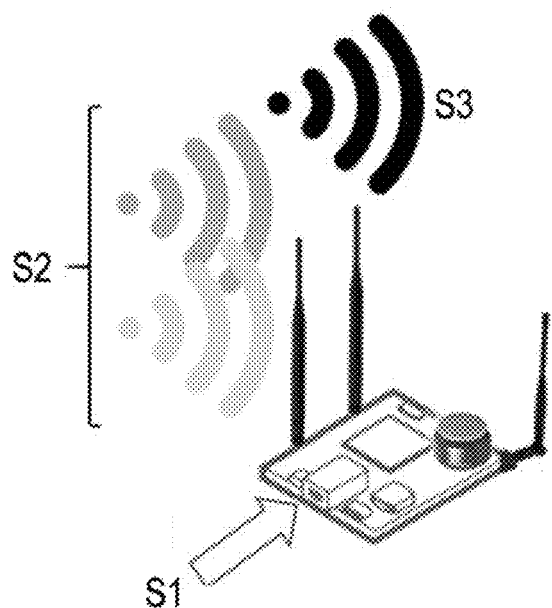
FIG. 2 an operation principle of the device of FIGS. 1A and 1B in a schematic view, according to certain embodiments described in the present disclosure.

In this context, the device 10 as shown in FIGS. 1a and 1b may operate both as a master device and as a relay device, as can be understood from FIG. 2. For that purpose, the device 10 may receive messages to be broadcasted both via a wired connection through its Ethernet interface 18 (arrow S1) or via its Bluetooth reception antenna which is part of the Bluetooth antenna module 14*b* (symbols S2). In some embodiments of the present invention, additional communication interfaces, such as means for long range radio transmissions and reception, may also be provided in device 10, wherein in said example the message to be broadcasted may initially be received by the master device from a remote device over a distance of tens or even hundreds of kilometers.

Depending on the channel over which the message to be broadcasted has been received, the microcontroller or processing unit may perform different tasks before actually broadcasting the message, namely either verifying the signatures of packets received through Bluetooth reception or configuring a message received via the Ethernet interface 18, in particular identifying the maximum length of a single packet to be broadcasted, splitting the message to be broadcasted into a number of packets the length of each not exceeding the identified maximum length and signing the packets. Additionally, the message may be encrypted and provided with metadata such as timestamps per packet. In one particular example, the advertisement packet functionality of the Bluetooth standard may be used for broadcasting the message, in which packets with a length of up to 31 octets can be sent. Thus, the message has to be split into small segments able to fit the advertisement packet length and signed by the master device before being broadcasted.

Afterwards and as shown by symbol S3, the message is broadcasted on a packet-by-packet basis wherein the packet transmission may be performed in a rotating manner. Both said rotating transmission of packets and the principle of avalanche broadcasting can be understood from FIG. 3, in which three identical devices 10, 10' and 10" are shown, of which the first device 10 operates as master or first layer device, the second device 10' operates as slave/relay or second layer device and the third device 10" operates as slave/relay or third layer device.

Figure 3:
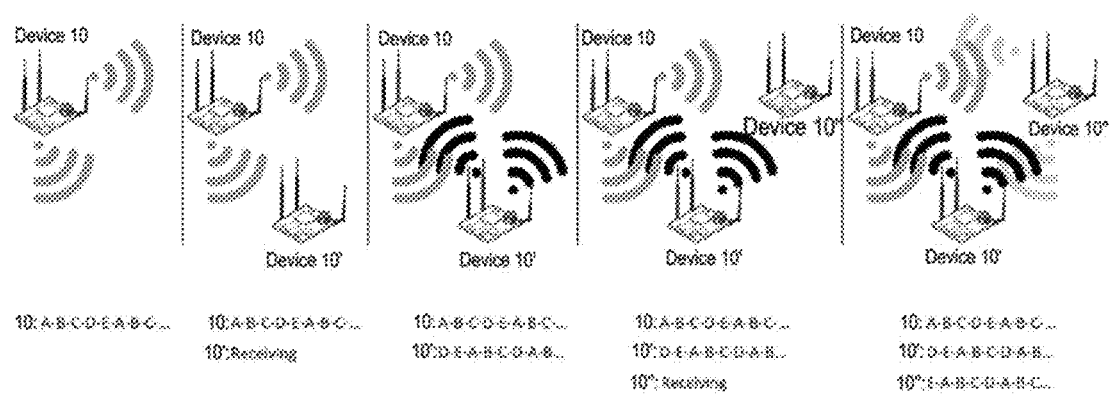
FIG. 3 depicts an illustration of establishment of a multilayer broadcast, according to certain embodiments described in the present disclosure.

FIG. 3 depicts an illustration of establishment of a multilayer broadcast, according to certain embodiments described in the present disclosure. FIG. 3 illustrates five steps. At step 1, master device 10 initially starts broadcasting a message which has been split up into multiple packets A, B, C, D, E, which are successively broadcast. After packet E has been broadcasted, device 10 again starts with broadcasting packet A, as shown at step 1. At step 2, Device 10' meanwhile receives the packets broadcasted by device 10, verifies their signatures and, at step 3, rebroadcasts them with a slight delay. In parallel, device 10' may display the received message to a user by means of a suitable display device. As shown at steps 2 and 3, master device 10 continues to successively broadcast packets A, B, C, D, E. As shown at step 3, device 10' continues to successively broadcasts packets A, B, C, D, E with a slight delay with respect to the broadcast of the master device 10.

Similarly, at step 4, device 10" receives the packets broadcasted by device 10', verifies their signatures and, at step 5, rebroadcasts them with another slight delay. This way, an avalanche broadcast can be established with which an arbitrarily large number of devices can receive and rebroadcast the message, such that basically no limitations on the geographical range of the broadcast will have to be expected. As shown at steps 4 and 5, master device 10 continues to successively broadcast packets A, B, C, D, E, device 10' continues to successively broadcast packets A, B, C, D, E with a slight delay with respect to the broadcast of the master device 10, and device 10" continues to successively broadcast packets A, B, C, D, E with another slight delay with respect to the broadcast of the device 10'.

General Considerations

Numerous specific details are set forth herein to provide a thorough understanding of the claimed subject matter. However, those skilled in the art will understand that the claimed subject matter may be practiced without these specific details. Other instances, methods, apparatuses, or systems that would be known by one of ordinary skill have not been described in detail so as not to obscure claimed subject matter.

Unless specifically stated otherwise, it is appreciated that throughout this specification, discussions utilizing terms such as "processing," "computing," "calculating," "determining," and "identifying" or the like refer to actions or processes of a computing device or processing unit, such as one or more computers or a similar electronic computing device or devices, that manipulate or transform data represented as physical electronic or magnetic quantities within memories, registers, or other information storage devices, transmission devices, or display devices of the computing platform.

The examples of systems, methods, and acts described in the embodiments presented previously are illustrative, and, in alternative embodiments, certain acts can be performed in a different order, in parallel with one another, omitted entirely, and/or combined between different embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

The system or systems discussed herein are not limited to any particular hardware architecture or configuration. A computing device or processing unit can include any suitable arrangement of components that provide a result conditioned on one or more inputs. Suitable computing devices or processing units include multipurpose microprocessor-based computer systems accessing stored software (e.g. stored on a storage unit) that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device. In certain examples, a storage unit includes any suitable non-transitory computer-readable medium for storing data, program code, or both. A computer-readable medium includes any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device reads instructions. The instructions could include processor-specific instructions generated by a compiler or an interpreter from code written in any suitable computer-programming language, including, for example, C, C++, C#, Visual Basic, Java, Python, Perl, JavaScript, and ActionScript. In certain examples, program code, which is stored in a non-transitory computer-readable medium (e.g. a storage unit), is executed by one or more processing devices (e.g. a processing unit) to cause a system to perform one or more operations or steps described herein.

Embodiments of the methods disclosed herein may be performed in the operation of such computing devices. The order of the steps presented in the examples above can be varied—for example, steps can be reordered, combined, and/or broken into sub-blocks. Certain steps or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action based on one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation and does not preclude the inclusion of such modifications, variations, and/or additions to the present subject matter as would be readily apparent to one of ordinary skill in the art.

What is claimed is:

1. A method for broadcasting messages by means of identification features of existing wireless communication protocols, comprising:
   identifying a maximum packet length specified by a wireless protocol;
   splitting a message into two or more packets, wherein the length of each packet of the two or more packets does not exceed the identified maximum packet length;
   causing a first layer device to broadcast the two or more packets by means of an identification feature of the wireless protocol;
   causing a second layer device to receive and rebroadcast the two or more packets via the identification feature of the wireless protocol, wherein the two or more packets are received by the second layer device from the first layer device; and
   causing a third layer device to receive and rebroadcast the two or more packets via the identification feature of the wireless protocol, wherein the two or more packets are received by the third layer device from the second layer device.

2. The method of claim 1, wherein the identification feature of the wireless protocol is an advertisement packet feature of a Bluetooth protocol or a service set identifier ("SSID") feature of an Institute for Electrical and Electronics Engineers ("IEEE") 802.11x Wi-Fi protocol.

3. The method of claim 1, further comprising one or more of:
   at a time before broadcasting the two or packets, signing the two or more packets;
   providing the two or more packets with metadata;
   at a time before splitting the message, encrypting the message; or
   at a time after splitting the message, encrypting the two or more packets.

4. The method of claim 3, wherein the metadata comprises a numbering or a timestamp for each of the two or more packets.

5. The method of claim 1, further comprising:
   receiving the message to be broadcasted via the identification feature of the wireless communication protocol.

6. The method of claim 5, further comprising verifying signatures of one or more packets of the received message.

7. A system for broadcasting messages, comprising:
   a device, comprising:
      a power supply unit;
      at least one wireless communication module; and
      a control unit powered by the power supply unit, operatively connected to the at least one wireless communication module, and adapted to perform operations comprising:
         identifying a maximum packet length by a wireless protocol;
         splitting a message into two or more packets, wherein the length of each packet of the two or more packets does not exceed the identified maximum packet length;
         causing a first layer device to broadcast the two or more packets by means of an identification feature of the wireless protocol;
         causing a second layer device to receive and rebroadcast the two or more packets via the identification feature of the wireless protocol, wherein the two or more packets are received by the second layer device from the first layer device; and
         causing a third layer device to receive and rebroadcast the two or more packets via the identification feature of the wireless protocol, wherein the two or more packets are received by the third layer device from the second layer device.

8. The system of claim 7, wherein the power supply unit comprises a battery or a battery charger unit.

9. The system of claim 7, wherein the at least one wireless communication module comprises at least two antennas.

10. The system of claim 7, further comprising one or more of a single control button or an indicator light-emitting diode ("LED").

11. The system of claim 7, wherein the at least one wireless communication module is adapted to selectively operate in a broadcast-only mode.

12. The system of claim 7, wherein the device is implemented as or comprises a single board computer.

13. The system of claim 7, wherein the device operates as a master device, the system further comprising at least one secondary device operating as a slave or relay device and at least capable of receiving the broadcasted packets.

14. The system of claim 13, wherein the at least one secondary device is adapted to execute a software application for displaying the broadcasted message reconstructed from the received packets.

15. The system of claim 13, wherein the at least one secondary device is adapted to execute a software application verifying a signature of the broadcasted packets.

16. The system of claim 13, wherein the at least one secondary device is a portable user terminal.

17. A method for broadcasting messages by means of identification features of existing wireless communication protocols, comprising:
- identifying a maximum packet length specified by a wireless protocol;
- splitting a message into a plurality of packets, wherein the length of each of the plurality of packets does not exceed the identified maximum packet length;
- causing a first layer device to sequentially broadcast the plurality of packets in a rotating manner by means of an identification feature of the wireless protocol, wherein sequentially broadcasting the plurality of packets comprises broadcasting the plurality of packets in sequence beginning with a first packet;
- causing a second layer device to receive, from the first layer device, the plurality of packets via the identification feature of the wireless protocol; and
- causing the second layer device to sequentially rebroadcast the plurality of packets in the rotating manner by means of the identification feature of the wireless protocol, wherein sequentially rebroadcasting the plurality of packets comprises rebroadcasting the plurality of packets in sequence beginning with a packet different from the first packet.

* * * * *